June 23, 1925.  1,543,503

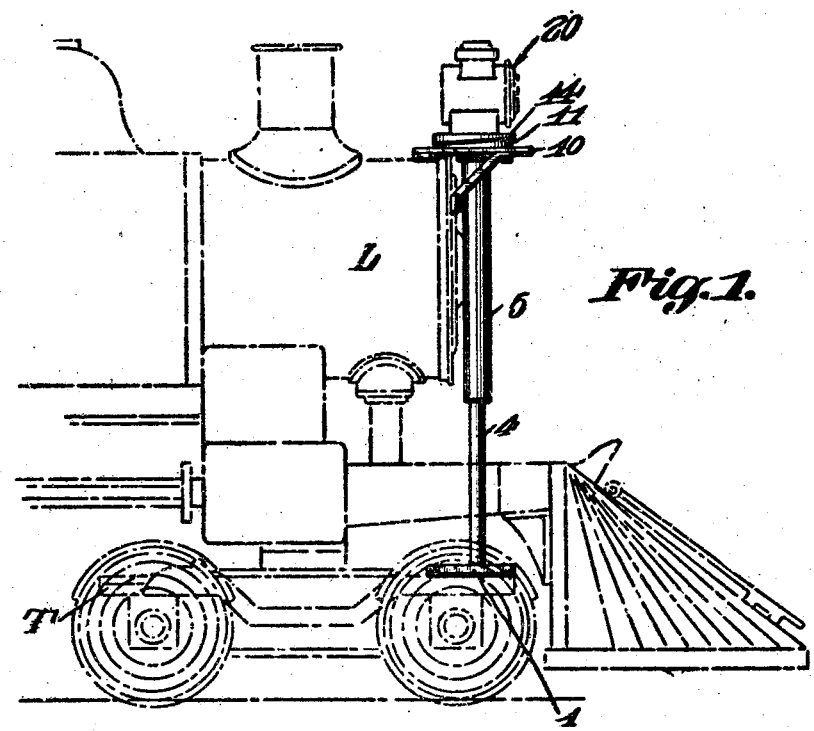
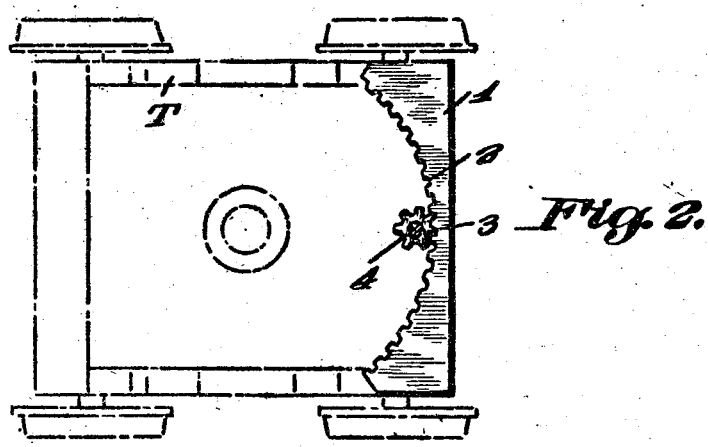

D. McKAY

LOCOMOTIVE HEADLIGHT

Filed April 17, 1924  2 Sheets-Sheet 2

D. McKay  Inventor

By C. A. Snow & Co.
Attorney

Patented June 23, 1925.

1,543,503

UNITED STATES PATENT OFFICE.

DONALD McKAY, OF MONTGOMERY, ALABAMA.

LOCOMOTIVE HEADLIGHT.

Application filed April 17, 1924. Serial No. 707,210.

*To all whom it may concern:*

Be it known that I, DONALD McKAY, a citizen of the United States, residing at Montgomery, in the county of Montgomery and State of Alabama, have invented a new and useful Locomotive Headlight, of which the following is a specification.

This invention relates to dirigible locomotive headlights.

The object of the invention is to provide a headlight of this character equipped with automatic means whereby the light rays of the headlight will be shifted according to the curvature of the track upon which the locomotive is travelling, thus materially reducing accidents occurring through inefficient light service and facilitating the operation of the train line, since greater speed may be maintained without danger of accidents by directing the light rays straight ahead of the locomotive at all times.

Another object of the invention is to so construct and mount a headlight of this character that the light will not only turn laterally with the front or pony truck of the locomotive but will tilt or move vertically according to the direction in which the truck tilts so that the full rays of the light will at all times fall on the track in front of the locomotive.

Another object is to provide a headlight of this character which is cheap to manufacture and install and has few parts to get out of order.

With the foregoing and other objects in view which will appear as the description proceeds, the invention resides in the combination and arrangement of parts hereinafter described and claimed, it being understood that changes in the precise embodiment of the invention herein disclosed, may be made within the scope of what is claimed without departing from the spirit of the invention.

In the accompanying drawings Fig. 1 represents a side elevation of the front portion of a locomotive with this improved headlight shown applied;

Fig. 2 is a plan view of a truck on which the operating mechanism for turning the head light is mounted, the rod carrying the gear being in section;

Figure 3:
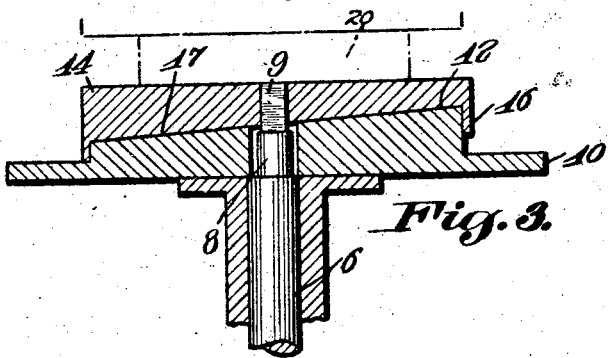
Fig. 3 is a vertical section partly in elevation of the light actuating mechanism constituting this invention.

In the embodiment illustrated the front or pony truck T is shown in Figs. 1 and 2 and at the front thereof on its upper face is fixedly mounted a plate 1 having an arcuate toothed rear edge 2 with which meshes a cog wheel or gear 3 carried by an upright shaft 4 so that on the turning of the truck the shaft will be correspondingly rotated.

The shaft 4 is rotatably and slidably mounted in a sleeve 5 which depends from a platform 10 secured to the upper portion of the front end of the locomotive L.

Another shaft 6 is mounted to rotate and move vertically in the sleeve 5, its inner end and the inner end of shaft 4 being normally spaced apart as shown in Fig. 3 to provide for the reciprocation of shaft 4 when the truck moves vertically without affecting shaft 6.

The upper end of shaft 6 is reduced as shown at 8 and extends loosely through a cam block 11 fixedly mounted on the upper face of platform 10. The terminal of shaft 6 is still further reduced as shown at 9 and is made polygonal in cross section to fit in a corresponding aperture of a cam 14 which is superposed on cam 11 and cooperates therewith in a manner presently to be described.

A key 7 connects shafts 4 and 6 and is mounted to slide in a key way 7ᵃ in shaft 6 whereby the shafts will turn in unison and yet permit them to reciprocate independently of each other.

The cam 11 is inclined transversely from one side to the other as shown at 12 while cam 14 has its lower face which cooperates with the cam face of block 12 inclined in the opposite direction as is shown clearly in Fig. 3 the cam 14 being mounted to turn with shaft 6 on the rotation of gear 3.

The cam 14 is provided with a peripheral flange 16 which projects beyond the cam face 17 thereof and is designed to encircle the periphery of cam block 11 so that these members will be held in operative relation.

Figure 4:
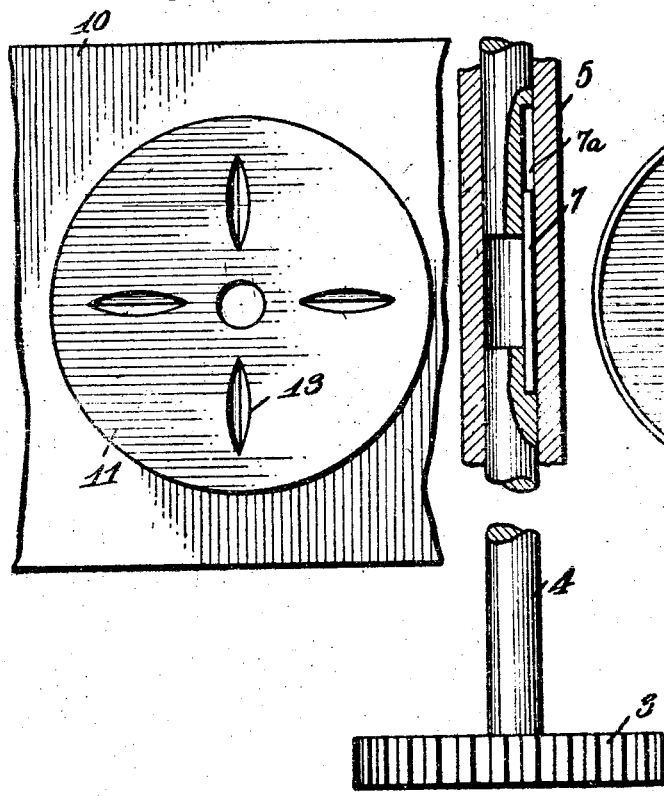
Fig. 4 is a top plan view of one of the cam members constituting a part of this invention.
Figure 5:
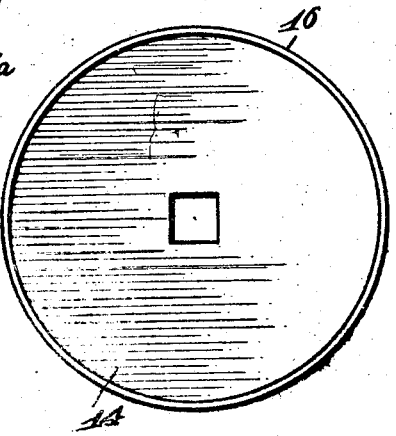
Fig. 5 is a bottom plan view of the other cam member.

The cam face 12 of block 11 is equipped with a plurality of grease grooves 13 shown in Fig. 4 to permit the two members 14 and 11 to move freely relative to each other without friction.

Operation.

The arangement of the two cams 11 and 14 with their abutting faces inclined in opposite directions causes the light to be elevated in accordance with the curves around which the locomotive passes so that the full force of the light will be thrown on the track thus permitting the engineer and firemen to see the track plainly. Ordinarily in curving tracks the elevation of the track is about from 2½ to 6 inches while the elevation of the light is from 3 to 12 inches.

I claim:—

1. In a dirigible headlight for locomotives, a platform to be mounted on a locomotive, a sleeve depending from said platform, a cam block fixed to the upper face of said platform, a cooperating cam mounted on said block and having a stem extended loosely therethrough into said sleeve, means connected with the truck of a locomotive to be rotated thereby, said means having a shank extending into said sleeve, said stem and shank being keyed to the sleeve to permit them to rotate in unison and to reciprocate independently, and a headlight fixed to said movable cam.

2. In a dirigible headlight for locomotives, the combination of a plate for attachment to a locomotive truck and having an arcuate toothed edge, a cog wheel meshing with said teeth, a stem rising from said cog wheel, a platform to be mounted on a locomotive, a sleeve depending from said platform and into which said stem projects, a cam block fixed to the upper face of said platform, a cooperating cam mounted on said block and having a stem extended loosely therethrough into said sleeve, said stems being keyed together to rotate in unison and to reciprocate independently, and a headlight fixed to said cam.

In testimony that I claim the foregoing as my own, I have hereto affixed my signature in the presence of two witnesses.

DONALD McKAY.

Witnesses:
W. M. PARKER,
D. C. KNOX.